April 15, 1941.     W. A. SABIN     2,238,604
ARTIFICIAL FISH BAIT
Filed July 14, 1938     2 Sheets-Sheet 1
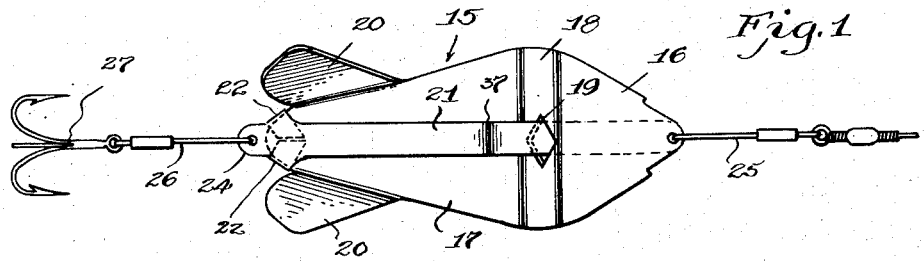
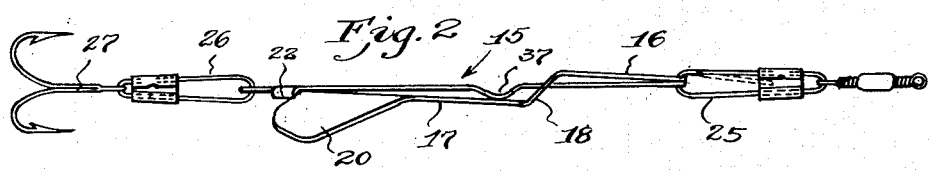
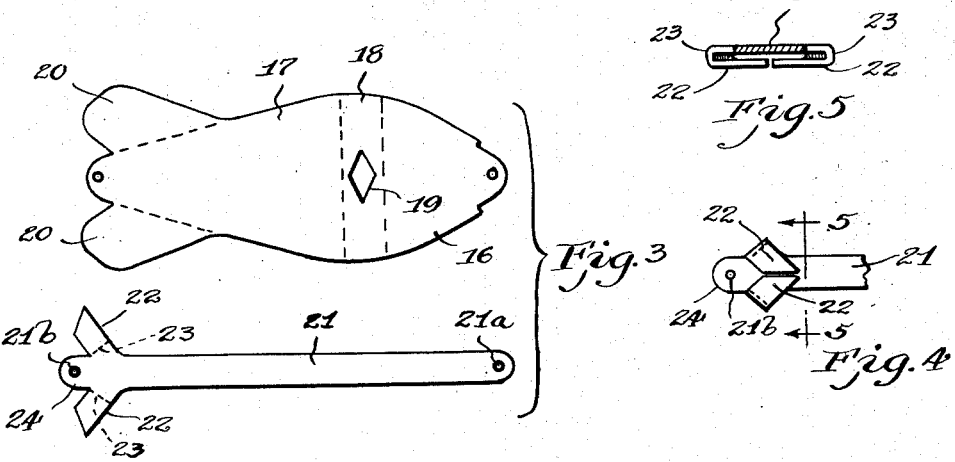
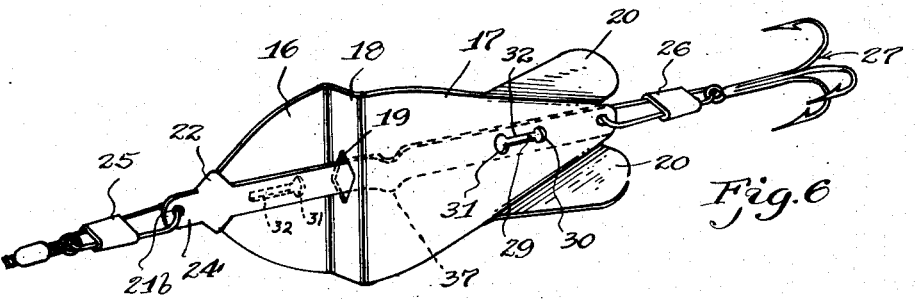
INVENTOR.
Wayne A. Sabin
BY Barnes, Kisselle, Laughlin & Raisch
ATTORNEYS April 15, 1941.   W. A. SABIN   2,238,604
ARTIFICIAL FISH-BAIT
Filed July 14, 1938   2 Sheets-Sheet 2
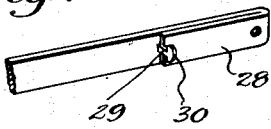
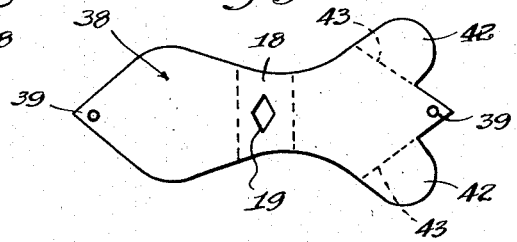
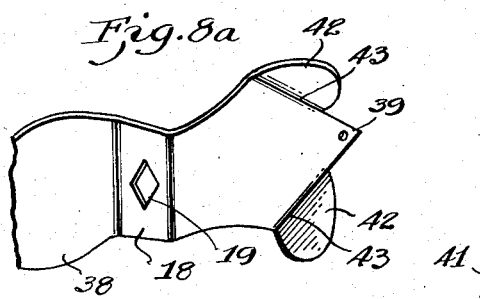
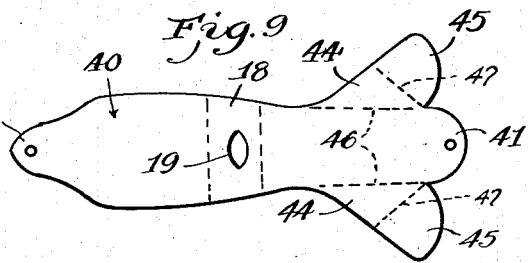
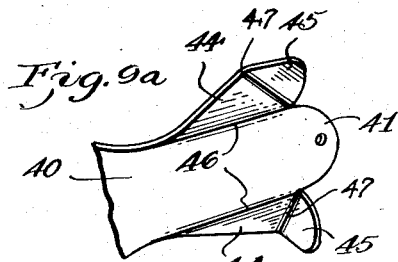
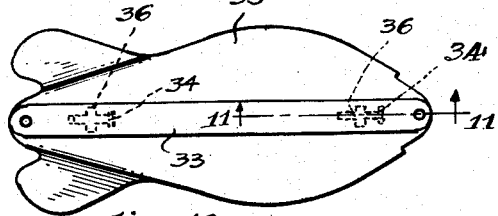
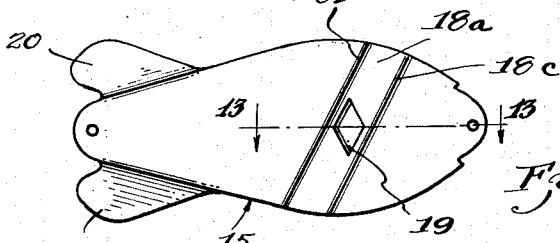
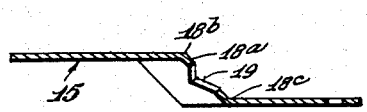
INVENTOR.
Wayne A. Sabin
BY
Barnes, Kisselle, Laughlin & Raisch
ATTORNEYS Patented Apr. 15, 1941

2,238,604

UNITED STATES PATENT OFFICE 2,238,604

ARTIFICIAL FISH BAIT

Wayne A. Sabin, Detroit, Mich.

Application July 14, 1938, Serial No. 219,219

14 Claims. (Cl. 43—42)

This invention relates to an artificial bait to be used as a fish lure.

At the present most artificial baits are each individually provided with hooks which are necessary to the bait. This means that considerable storage space is necessary for the baits and usually it is essential to provide a tackle box for carrying the various baits which are to be used.

One object of the present invention is to provide an attachment for fishing baits which is so designed that a series of dissimilar baits may be used with the attachment. A further object of the invention is to provide a bait attachment which has the necessary hooks permanently fastened thereto, and which is adapted to be used in cooperation with individual baits.

A further object of the invention is to provide baits which may be conveniently nested for purposes of packaging or carrying so that a fisherman may carry a number of different colored and different shaped baits in a small compact bundle in his pocket and use the baits individually as he so desires. Another object of the invention is to provide a bait attachment whereby the plug may be reversed on the attachment.

Additional objects of the invention have to do with details of design of particular baits whereby their movement in the water is novel.

Other objects and features of the invention have to do with details of construction and operation as will be further brought out in the following description and claims.

In the drawings:

Fig. 1 is a side view of the assembly of the bait and attachment therefor.

Fig. 2 is a plan view of the same.

Fig. 3 is a plan view of the blanks of portions of the bait in the process of their formation.

Fig. 4 is a partial view of the attachment member shown in Fig. 3 after it has been formed.

Fig. 5 is a section taken on lines 5—5 of Fig. 4.

Fig. 6 is a perspective assembly of the invention with a modified form of attachment.

Fig. 7 is a detail view of a portion of the attachment member shown in Fig. 3, when used with the modified bait of Fig. 6.

Figs. 8 and 9 are views of the blank which are used to form additional modifications of my invention.

Figs. 8a and 9a show the blanks of Figs. 8 and 9 formed into shape.

Fig. 10 illustrates an additional means of fastening the baits to the attachment means.

Fig. 11 is a section on lines 11—11 of Fig. 10.

Fig. 12 is a modification of the baits shown in Figs. 1 and 6.

Fig. 13 is a section taken on lines 13—13 of Fig. 12.

In Figs. 1 and 2, I have shown two views of a preferred embodiment of my invention. A bait member 15 is formed preferably of sheet metal and has an elongated substantially elliptical shape as shown. The bait member 15 consists essentially of three parts, a front plane 16, a rear plane 17, and a transverse offset portion 18 between the front and rear planes. The transverse offset portion or shoulder 18 is formed at an angle to the longitudinal axis of the bait member 15 as shown particularly in the plan view of Fig. 2. In a modified form shown in Fig. 12, I have provided a shoulder 18a which is substantially transverse of the bait member but which has its plane at an angle to the longitudinal axis and also its longitudinal edges 18b and 18c formed at an angle to said axis. These shoulders 18 are provided with a substantially central aperture 19, the purpose of which will later be described. At the rear of the plane 17 are formed wing or tail members 20, these members being bent at an angle to the general plane of the bait so that they will impart a rotating motion to the bait as it is drawn through the water.

An attachment means for the bait is shown in Figs. 1 and 3. This means consists of a bar 21 which is shown in blank form in Fig. 3. This bar has arms 22 extending therefrom at an angle. The arms are bent on the dotted lines 23 to a position shown in Fig. 4 so that the ends of the arms 22 meet substantially at the middle of the bar 21 (Fig. 4) but are spaced therefrom as shown in Fig. 5. An end 24 of the bar extends beyond the members 22 after they are in their folded position.

The bar 21 is dimensioned so that one end of it will pass through the aperture 19 in the bait 15. The members 22 form a recess on the bar which is adapted to receive an end of the bait member, as shown particularly in Fig. 1. The ends of the bait member 15 are preferably formed so that either of them may be received by the recess formed by the members 22 of the bar. Consequently, the bar 21 may be passed through the bait in either direction and the recess formed by the members 22 will receive one end of the bait. The forward end of the bar 21 is provided with an aperture 21a which registers with a similar aperture at the forward end of the bait 15. These apertures are provided to receive a portion of a fastening clip 25, the latter being preferably provided with a swivel, as is commonly known in the fishing lure art. This swivel is fastened at one end to the line used by the fisherman. The other end 24 of the bar 21 is provided with a small aperture 21b which is to receive a clip 26, at one end of which is fastened a hook unit 27. This attachment relationship of Fig. 1 may be reversed and is shown as such in Fig. 6, where it will be seen that the end 24 of the bar has the line clip unit 25 fastened thereon and the other end of the bar 21 is fastened to the bait by the hook clip 26. The clips 25 and 26 are so constructed that they may be opened and readily removed from the bar. The bait members 15 are formed in such a manner that they may be nested or stacked and consequently easily packed or carried.

When a bait is to be changed, the clip 25 (Fig. 2) may be opened and withdrawn from the apertures of the bar 21 and the bait 15. The bar 21 may then be withdrawn through the aperture 19 of the bait and another bait, having a different shape or a different color, may be assembled with the same bar 21 and clip 25. In some cases, the fisherman may desire to reverse the bait on the bar to change the water movement thereof.

In Figs. 6 and 7, I have shown a modification of my invention. In this modification the end of the bar 21 opposite from the members 22 is formed as shown in Fig. 7, with a turn back portion 28 which is provided with an upstanding lug 29. The lug 29 has an enlarged end portion 30 as shown. The bait member shown in Fig. 6 is provided with keyhole slots in each end thereof which consist of a large opening 31 and a slot opening 32. In assembling the bait and bar of this modification, the end 28 of the bar is inserted through the aperture 19 until lug 29 is positioned near the opening 31. The enlarged portion 30 of the lug is then passed through the opening and the bar moved so that the lug 29 passes into the slot 32. The portions 22 of the bar pass over the nose of the bait as before. This modification of the bait and attachment is also reversible.

Still another modification of the invention is shown in Figs. 10 and 11 where a bar 33 is shown with two upstanding studs 34 and enlarged heads and the bait 35 is shown with cross-shaped slots 36. The members 33 and 35 are assembled by passing the studs 34 through the holes 36 and moving the members relative to each other. The members are then fastened against relative longitudinal movement with a clip, as in the modifications previously described.

In some cases it may be found desirable to provide the bar 21 with a bend 37 which is adapted to contact a face of the plane portion 17 (Fig. 2). This bend or offset portion 37 will cause a slight bending of the bar and thus result in its being held more firmly in place. The holes which are provided in the ends of the bar 21 and also in the ends of the baits are preferably just slightly larger than the diameter of the wire members used in the clips to avoid any more play than is absolutely necessary.

In Figs. 8 and 9, I have shown two shapes of bait members which are particularly adapted to be used with the attachment means. It will be noted that in Fig. 8, for example, a bait member 38 is provided with a triangular nose 39 at each end thereof so that the bait is reversible. Similarly in Fig. 9 a bait member 40 is provided with noses 41 which are similar in contour. Each bait is provided with a hole 19 as in the previous modifications. In Fig. 8 the blank 38 is provided with fins 42 which are to be bent on the dotted lines 43 which are at an angle of about 35° from the axis line of the bait. These fins 42 are preferably bent so that they form a 45° angle with the plane of the bait. Each wing 42 is bent, of course, in a different direction from the plane of the bait. In Fig. 9, each side of the bait is provided with a wing formed by two portions 44 and 45. The portions 44 are bent on the dotted lines 46 at an angle of substantially 45° from the main surface. The portions 45 are then bent on the lines 47 at an angle of 45° with the portions 44.

If desired, the wings 42 of the embodiment of Fig. 8 may not only be bent from the plane of the bait but also curved slightly toward the bait. Figs. 8a and 9a show the blanks of Figs. 8 and 9 as they appear after being bent.

I have found that the bending of the fins, as above described, when used in connection with the offset shoulder portion 18 provides a bait which has a novel tumbling action when drawn through the water; it not only goes from side to side or up and down as it twirls around, but it also has an increased spinning action which seems to attract fish.

My invention may also be used with spoons which are more oval in shape. In this case a shorter attachment bar would be used. In some cases it may also be desirable to place two or more hook units on the attachment bars, the lures being still free from hook units.

What I claim is:

1. A fishing lure comprising a bait member formed of sheet metal and provided with a transverse portion offset to form an angle with ends of said member, said offset portion being provided with an aperture, an attachment member adapted to pass through said aperture having one end adapted to be fastened to a fishing line, a hook unit on the other end of said attachment member, and means for detachably fastening said members.

2. A fishing lure comprising a bait member formed of sheet metal, an attachment member provided with a recess at one end to receive one end of said bait member, said attachment member being adapted to be fastened at one end to an end of said bait member and to a line, and to have a hook unit fastened at the other end.

3. A fishing lure including a bait member comprising a sheet metal piece having offset ends connected by a transverse portion disposed at an angle to said ends and provided with an aperture, and an attachment member comprising a bar having one end adapted to pass through said aperture and having a recess at the other end to receive, selectively, either end of said bait member, one end of said bar being adapted to be permanently fastened to a hook unit and the other end of said bar being adapted to be fastened to said bait member and to a fishing line.

4. A fishing lure including a bait member comprising a sheet metal piece having offset ends connected by a transverse portion disposed at an angle to said ends and provided with an aperture, and an attachment member comprising a bar having one end adapted to pass through said aperture and having a recess at the other end to receive, selectively, either end of said bait member, one end of said bar being adapted to be permanently fastened to a hook unit and the other end of said bar being adapted to be fastened to said bait member and to a fishing line, said bar having a bent portion for contacting a plane of said bait whereby said bar is resiliently in contact with said bait.

5. A fishing lure including a bait member comprising a sheet metal piece having offset ends connected by a transverse portion disposed at an angle to said ends and provided with an aperture, and an attachment member comprising a bar having one end adapted to pass through said aperture and having a recess at the other end formed by bent over arms extending from each side of said bar and adapted to receive, selectively, either end of said bait member, one end of said bar being adapted to be permanently fastened to a hook unit and the other end of said bar being adapted to be fastened to said bait member and to a fishing line.

6. A fishing lure including a bait member comprising a sheet metal piece having offset ends connected by a transverse portion having the plane thereof disposed at an angle to said ends and provided with an aperture, said end portions each being provided with openings, a reversible attachment member comprising a bar having at least one end adapted to pass through said aperture and having an outstanding portion at one end adapted to pass through and be retained by the margins of one of said openings, means for fastening the other end of said bar to said bait, and a hook unit fastened to one end of said bar.

7. A fishing lure including a bait member comprising a sheet metal piece having offset ends connected by a transverse portion having the plane thereof disposed at an angle to said ends and provided with an aperture, said end portions each being provided with openings, a reversible attachment member comprising a bar having at least one end adapted to pass through said aperture and having an outstanding portion at one end adapted to pass through and be retained by the margins of one of said openings, the other end of said bar being fastened to said bait by a clip means passing through both of said members, and a hook unit fastened to one end of said bar.

8. A fishing lure including a bait member comprising a sheet metal piece having offset ends connected by a transverse portion, said end portions each being provided with longitudinally extending keyhole openings, and a reversible attachment member comprising a bar having one end adapted to pass through said aperture and having an outstanding portion at that end for engaging the margins of one of said keyhole openings, and a recess at the other end to receive, selectively, either end of said bait member, and a hook unit fastened to one end of said bar.

9. A fishing lure including a bait member comprising a sheet metal piece having offset ends connected by a transverse portion, said end portions each being provided with longitudinally extending keyhole openings, and a reversible attachment member comprising a bar having one end adapted to pass through said aperture and having an outstanding portion at that end for engaging the margins of one of said keyhole openings, and a recess at the other end formed by bent over arms extending from each side of said bar and adapted to receive, selectively, either end of said bait member, and a hook unit fastened to one end of said bar.

10. A fishing lure comprising a bait member shaped of sheet metal and provided with aligned apertures substantially at each end thereof, and a reversible attachment means comprising a bar having a hook attached thereto and adapted to be connected to a fishing line, said bar having lugs spaced thereon as said bait apertures and adapted to pass through said apertures and be retained by the margins thereof.

11. A fishing lure comprising a bait member shaped of sheet metal and provided with aligned cross-shaped apertures substantially at each end thereof, and a reversible attachment means comprising a bar having a hook attached thereto and adapted to be connected to a fishing line, said bar having lugs spaced thereon as said bait apertures and adapted to pass through said apertures and be retained by the margins thereof, and means for locking said bar and bait against relative sliding movement.

12. A fishing lure to be used with an independent attachment and hook means comprising a reversible sheet metal bait shaped substantially to a point at each end and having opposed tail portions bent from the plane of said bait at one end, said tail portions being bent on lines forming a substantial angle with the longitudinal axis of said bait.

13. A fishing lure comprising a shaped, non-perishable bait member, an attachment member adapted to be fastened at one portion to a fishing line and at another portion to a hook unit, means, for holding said members together, disengageable by relative movement between said members, and line-attaching means restraining said members against a disengaging relative movement.

14. A fishing lure comprising a shaped, non-perishable bait member, an attachment member adapted to be fastened at one portion to a fishing line and at another portion to a hook unit, a detachable fastening means for connecting said attachment member to a line or a hook, means, disengageable by relative movement between said members, for holding said members together, said fastening means being arranged to lock said members against a disengaging relative movement.

WAYNE A. SABIN.